Nov. 7, 1961 C. L. WANLASS 3,008,056

GENERAL LOGICAL GATING SYSTEM

Filed Nov. 25, 1955 2 Sheets-Sheet 1

INVENTOR.
CRAVENS L. WANLASS

BY William R. Lane

ATTORNEY

Nov. 7, 1961 C. L. WANLASS 3,008,056

GENERAL LOGICAL GATING SYSTEM

Filed Nov. 25, 1955 2 Sheets-Sheet 2

INVENTOR.
CRAVENS L. WANLASS

BY William R. Lane

ATTORNEY

United States Patent Office 3,008,056

Patented Nov. 7, 1961

3,008,056

GENERAL LOGICAL GATING SYSTEM

Cravens L. Wanlass, Whittier, Calif., assignor to North American Aviation, Inc.

Filed Nov. 25, 1955, Ser. No. 548,826
4 Claims. (Cl. 307—88.5)

This invention relates to a method of gating, more particularly it relates to a system of gating using pulses.

Ordinarily, digital computers use a system of logical circuitry through which the flow of information occurs at synchronized intervals indicated by a gating signal from a reference. This gating signal is termed a "clock pulse." Voltage levels at various stages throughout the circuitry are sampled at the clock pulse rate and information flows throughout the computer simultaneously. The general practice is to gate voltage levels through diodes by means of the clock pulses. The concept of this invention is to gate the pulses created by the clock through the various diodes by means of voltage levels. In this manner, current flows for very short intervals of time, namely, the clock pulse width interval. In the former systems, current flowed for considerably longer periods of time. Considerable power is saved by this invention. Inasmuch as a computer uses a large number of electronic components, some of which are heat sensitive (e.g., germanium diodes), power consumption and heat transfer are important factors. Reduction of power consumption correspondingly reduces the heat transfer problem.

Logical circuitry can be considered to be an electrical network responsive to information received from a plurality of sources such as flip-flops, electronic storage devices, transducers, etc., and delivering at its output information reflecting a particular function of the input. Logical circuits are connected in particular fashion to provide the required function of their input. This is termed "mechanizing a logical equation." In many cases, long, complicated functions must be obtained by the use of such logical circuitry. The pulse gating system of the device of the invention allows ready cascade of electrical elements, such as diodes, to provide simpler mechanization of the complicated equations. Further, this particular system allows a reduction in a number of diodes necessary to mechanize a given logical equation.

It is therefore an object of this invention to provide a logical gating system utilizing pulse gating.

It is another object of this invention to provide a gating system which reduces considerably the amount of power required to operate a digital computer.

Another object of this invention is to provide a gating system allowing ready cascade of elements performing logical functions.

It is another object of this invention to provide a logical gating system capable of being used to mechanize long, complicated equations.

A still further object of this invention is to provide a logical circuit in which pulses are gated according to voltage levels.

Figure 1:
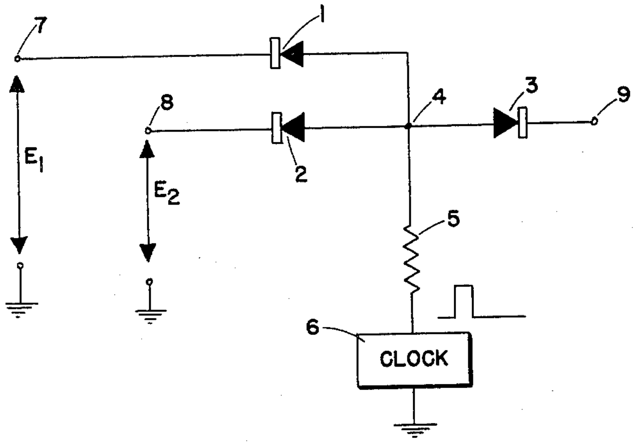
Figure 2:
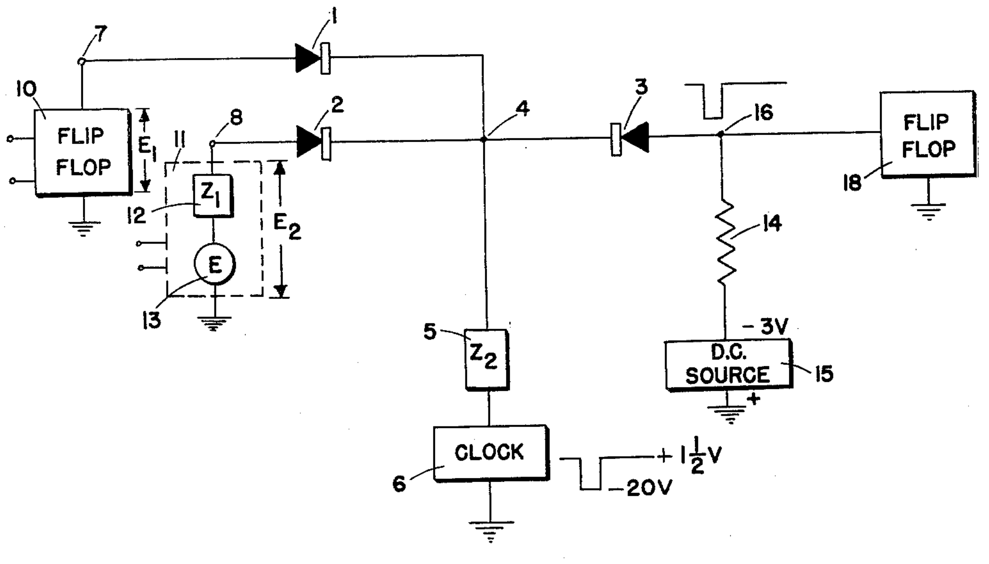
Figure 3:
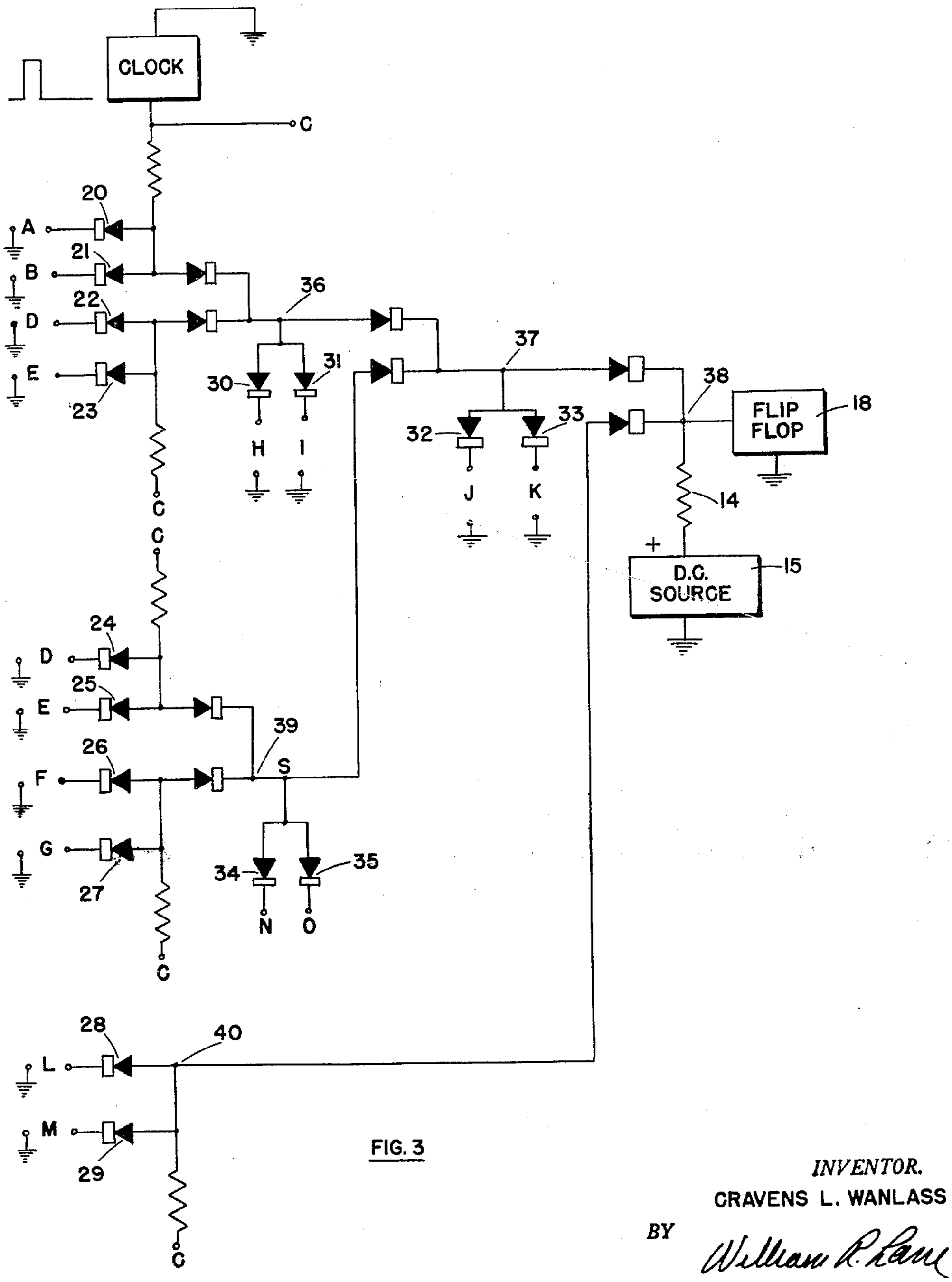

Other objects of invention will become apparent from the following description taken in connection with the accompanying drawings, in which FIG. 1 is a schematic diagram of a pulse gating circuit;

FIG. 2 is a schematic diagram of a pulse gating circuit using negative pulses;

And FIG. 3 is a schematic diagram of the mechanization of a more complicated equation.

Referring to FIG. 1, diodes 1, 2 and 3 have a similar element, their anodes, connected together to a common point 4. Point 4 is further connected to an impedance, in this case a resistor 5, which is further connected to a clock pulse generating source 6 providing positive pulses of approximately 20 volts. The pulse width is considerably less than the interval from one pulse to the next. Clock 6 is further connected to ground. At terminal 7 is received a first input voltage level, for example, voltage $E_1$. At terminal 8 is received a second voltage level, $E_2$. At terminal 9 is the output of the circuit of FIG. 1. In digital computers using the binary system, a source of information such as a flip-flop may place terminal 7 at either of two voltages, one of which allows diode 1 to conduct when clock pulses are received at point 4. Terminal 8 may, likewise, be placed by another flip-flop at one of the two voltage levels. The output at 9 is dependent on the combination of voltages received at terminals 7 and 8. If voltage $E_1$ is high, and the voltage $E_2$ is high, and a clock pulse is received from clock 6, neither diodes 1 nor 2 conduct, and point 4 receives the pulse which passes through diode 3 to terminal 9. However, if terminal 7 is low, the pulse is shorted through diode 1 and point 4 does not rise in potential and no pulse passes through diode 3 to terminal 9. Similarly, if terminal 8 is low, diode 2 prevents point 4 from rising in potential and no pulse passes to terminal 9. Diodes 1 and 2 form an "and" gate because a pulse is received at terminal 9 only if terminals 7 "and" 8 are at a high potential.

FIG. 2 illustrates utilizing a negative clock pulse. In this case diodes 1, 2 and 3 are reversed. The similar element connected together is the cathode of each diode. The pulse received from clock source 6, in this instance, may be a negative 20 volt pulse starting from +1½ volts. Point 4 is ordinarily at +1½ volts. Flip-flops 10 and 11 are shown supplying the voltages $E_1$ and $E_2$ to terminals 7 and 8. These flip-flops may be set in accordance with information received from other sources. Flip-flop 11 is broken down into an internal impedance 12 and an internal D.-C. voltage source 13. Assuming that the outputs of flip-flops 10 and 11 might be either minus 10 volts or zero volts, the following equation must be true in order that diode 3 does not conduct when one of terminals 7 or 8 is at the high state, $E_{high}$, of the flip-flop voltage output:

$$E_{\text{high}}-\frac{(E_{\text{high}}-20\ \text{v.})Z_1}{Z_1+Z_2}\geqq -3\ \text{v.} \qquad (1)$$

where

—20 v. is the clock pulse voltage
$E_{high}$ is zero volts in the case being described,
—3 v. is the voltage of source 15,
$Z_1$ is the impedance of element 12,
$Z_2$ is the impedance of element 5 (preferably resistive).

The above equation allows point 4 to lower to —1 or —2 volts when terminal 7 or 8 is at zero volts. Diode 3 still does not conduct because its anode is connected through resistor 14 to a —3 volt supply 15. However, if both of terminals 7 and 8 are at —10 volts, point 4 tends to drop well below the potential at point 16, which allows diode 3 to conduct, and a pulse is received at point 16 resembling the wave form shown at that point. The output wave form of the gate at point 16 is the trigger pulse to the flip-flop 18. It can be seen from this circuitry that voltage levels are not gated through the various diodes but rather the pulses are allowed to flow along a certain path according to the voltage levels of the diodes. It is a significant feature that each diode is biased in a nonconducting direction until the clock pulse appears. It is thus apparent that the clock controls the potential of the common point 4, by being resistively coupled thereto; and the clock is never isolated from point 4 because no diode is interposed between them, as is common in the prior art.

FIG. 3 illustrates the mechanization of a complex logical equation using a positive clock pulse described as follows:

$$\text{Pulse}=\{[(AB+DE)HI+(DE+FG)NO]JK+LM\}C \quad (2)$$

where A, B and D through O are flip-flops providing the high or low voltage levels to the cathodes of the various diodes 20 through 35. The literal translation of Equation 2 indicates that a positive pulse is received at the output to set a flip-flop whenever: (beginning at the end of the equation and working backwards) a clock pulse occurs, and the L and M flip-flops are at their high levels or if a clock pulse occurs and the J and K flip-flops are at their high levels together with:

(1) Flip-flops N and O and either D and E or F and G being at their high levels, or
(2) Flip-flops H and I and either A and B or D and E being at their high levels.

It will be noted that Equation 2 requires several "and" and "or" logical combinations. The terms "and" and "or" are common terms used in the computer art and an explanation of their meaning and the various ways of constructing circuits to accomplish their function may be found throughout publications on computers and computer techniques. One such book explaining these terms and showing them in mechanized form is Arithmetic Operations in Digital Computers, published by D. Van Nostrand Company, Inc., written by R. K. Richards, on page 27, et seq. The convention chosen is that the high voltage state is the true state and the low voltage state is the false state. Each of the following flip-flops A, B, H, I, J and K are assumed to be in the high state and all other flip-flops are assumed to be in the low state. It will be noted that Equation 2 is satisfied, and a pulse should appear at the output when the clock pulse occurs. Upon the clock pulse, positive in this instance, point 37 will receive a positive pulse if the flip-flops A, B, H, I, J and K are high. If point 37 receives a positive pulse, the pulse will also appear at point 38. Therefore, the equation has been correctly mechanized for the flop-flop 18 to receive a pulse. The flip-flops, in operation, may remain in a given state for as short a time as the time between clock pulses or in the case of a 50 kc. clock pulse 20 microseconds. The clock pulse duration should, of course, be considerably shorter.

Assume now that flip-flop outputs A, B, D, E, F, G are in the true state and all others are in the false state. When the clock pulse occurs, points 36 and 37 do not receive a pulse because flip-flops H and I are low. In addition, point 39 receives no pulse because N and O are also low. Point 40 will remain low because L and M are low. Therefore, point 38 will not receive a pulse but will remain at a low potential. The result is that no positive pulse is presented to flip-flop 18. Therefore, the Equation 2 expressed above was mechanized correctly.

Many complex logical equations can be mechanized using this gating system of cascading which is limited only by the forward voltage drop across diodes lying directly in the path. It is noted that not all diodes lie directly in the pulse path. Those that do not lie in the pulse path cause no voltage drop.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Logical gating means comprising a first plurality of diodes, a similar element of each said diode connected in common, a resistor, clock pulse generating means connected in series circuit with said common connection of said diodes and said resistor, a first output diode connected to the common connection of said first plurality diodes providing an output path for the pulses created upon the pulse generated by said clock pulse generating means, means for establishing voltage levels of the remaining element of said first plurality of diodes, a second plurality of diodes, a similar element of each said diode connected in common, a second resistor, said clock pulse generating means connected in series circuit with said common connection of said second plurality of diodes and said second resistor, a second output diode connected to the common connection of the said second plurality of diodes providing an output path for the pulses created upon the generation of a pulse by said clock pulse generating means, means for establishing the voltage level of the remaining element of said second plurality of diodes, the output of said output diodes connected together, and wherein is included a further plurality of diodes having similar elements of each connected to the common connection of said output diodes, a third output diode connected to the common connection of said first and second output diodes providing a continuing output path for the pulses of said clock pulse generating means, and means for establishing the voltage level on the remaining element of said further plurality of diodes.

2. A plurality of diodes having a similar element connected together at a common connection, said common connection further connected solely to first, a first series circuit consisting, in order, of a resistor and clock pulse generating means, and said clock pulse generating means being further connected to a reference ground potential, and second, to a second series circuit comprising, in order, an output diode, said latter diode further connected to a series circuit comprised of a resistor, and a direct current source having a potential relative to the potential provided by said clock pulse generating means between pulses, sufficient to place a back bias voltage across said output diode, said direct current source being further connected to a reference ground potential, and wherein is further included means for establishing the potentials with respect to said reference ground potential of the element of each of said plurality of said diodes not connected in common, said clock pulse generating means providing a potential sufficient to back-bias said plurality of diodes between clock pulses at all said voltage levels of said means for establishing voltage levels.

3. A plurality of diodes connected in "and" fashion, said diodes having a common connection, clock pulse generating means, a series circuit consisting of a resistor and electrical connections thereto, directly connecting, without interruption, said clock pulse generating means to the common connection of said diodes, means for establishing voltage levels of the remaining elements of said plurality of said diodes, said clock pulse generating means providing a potential between pulses so as to place a back-bias across said plurality of diodes between clock pulses at all said voltage levels of said means for establishing voltage levels, and an output diode having one terminal connected to the common connection of said diodes, said common connection being connected solely to said series circuit and said output diode, resistance means having one terminal connected to the remaining terminal of said output diode, means establishing the potential of the remaining terminal of said resistance means relative to the potential provided by said clock pulse generating means between pulses, sufficient to place a back bias voltage on said output diode so as to render said output diode non-conducting between clock pulses.

4. A plurality of diodes connected in "or" fashion, said diodes having a common connection, clock pulse generating means, a series circuit consisting of a resistor and electrical connections thereto, directly and continuously connecting said means to the common connection of said diodes, means for establishing the voltage levels of the remaining elements of said plurality of diodes, clock pulse generating means providing a potential sufficient to back-bias said plurality of diodes between clock pulses at all said voltage levels of said means for establishing voltage levels, and an output diode having one terminal connected to the common connection of said diodes, said common connection being connected solely to said series circuit and said output diode, resistance means having one terminal connected to the remaining terminal of said output diode, and means establishing the potential of the remaining terminal of said resistance means relative to the potential provided by said clock pulse generating means between pulses, sufficient to place a back bias voltage on said output diode so as to render said output diode non-conducting between clock pulses.

References Cited in the file of this patent

UNITED STATES PATENTS

| | | |
|---|---|---|
| 2,266,509 | Percival et al. | Dec. 16, 1941 |
| 2,476,066 | Rochester | July 12, 1949 |
| 2,557,729 | Eckert | June 19, 1951 |
| 2,603,746 | Burkhart | Juy 15, 1952 |
| 2,670,445 | Felker | Feb. 23, 1954 |
| 2,712,065 | Elbourn | June 28, 1955 |
| 2,760,087 | Felker | Aug. 21, 1956 |
| 2,762,936 | Forrest | Sept. 11, 1956 |
| 2,820,897 | Dean | Jan. 21, 1958 |
| 2,823,855 | Nelson | Feb. 18, 1958 |
| 2,914,667 | Branch | Nov. 24, 1959 |

OTHER REFERENCES

Pub. 1, Rev. of Scien. Inst., vol. 18, No. 8, August 1947, pp. 551–556.